(12) United States Patent
Whitt et al.

(10) Patent No.: US 7,724,507 B2
(45) Date of Patent: May 25, 2010

(54) ARC FLASH ENCLOSURE

(75) Inventors: John G. Whitt, Cedar, MN (US); Kent G. Messing, Elk River, MN (US); Robert M. Kalstabakken, Cambridge, MN (US)

(73) Assignee: Hoffman Enclosures, Inc., Anoka, MN (US)

( * ) Notice: Subject to any disclaimer, the term of this patent is extended or adjusted under 35 U.S.C. 154(b) by 834 days.

(21) Appl. No.: 11/552,375

(22) Filed: Oct. 24, 2006

(65) Prior Publication Data
US 2008/0093932 A1 Apr. 24, 2008

(51) Int. Cl.
*G06F 1/16* (2006.01)
(52) U.S. Cl. .............. 361/679.04; 312/234.1; 292/285; 200/355; 371/112
(58) Field of Classification Search ............ 312/223.6, 312/200, 215, 234.2, 288; 292/59, 201, 285; 200/50.6, 336, 50.01, 355; 361/818, 679.31, 361/679.04, 679.01, 679.33; 439/181; 711/153; 307/10.1, 112
See application file for complete search history.

(56) References Cited

U.S. PATENT DOCUMENTS

| | | | |
|---|---|---|---|
| 5,515,235 A * | 5/1996 | Stoller | 361/605 |
| 6,974,922 B2 * | 12/2005 | Bortolloni et al. | 200/50.06 |
| 2007/0085347 A1 * | 4/2007 | Malkowski et al. | 292/59 |
| 2009/0021925 A1 * | 1/2009 | Heimann et al. | 361/818 |
| 2009/0267466 A1 * | 10/2009 | Zook et al. | 312/223.6 |

* cited by examiner

*Primary Examiner*—Hung V Duong
(74) *Attorney, Agent, or Firm*—Greenberg Traurig, LLC

(57) ABSTRACT

An enclosure assembly includes a first enclosure unit including a first door, a second enclosure unit, and a handle coupled to the second enclosure unit, the handle being operative so as to turn on or turn off power to the first enclosure unit, and wherein the first enclosure unit and the second enclosure unit are configured such that the first door cannot be opened if the handle has not been turned to a power-off position.

15 Claims, 7 Drawing Sheets

ARC FLASH ENCLOSURE

FIELD OF THE INVENTION

This invention relates to the field of electrical enclosures, and more specifically to an enclosure designed to protect against arc flashes.

BACKGROUND

Electrical enclosures can be used to house assorted electrical and datacom equipment. The enclosure protects the electrical equipment from the environment and helps prevent access to the equipment. The majority of enclosures need the power entering the enclosure to be turned off at a disconnect switch or circuit breaker before the enclosure can be opened. However, some enclosures do need to be accessed with the power still on (e.g., for troubleshooting). Both of these scenarios can still lead to a dangerous situation due to live circuits still being present in the enclosure. Even with the power off, live circuits are present upstream of the disconnect switch/circuit breaker. A short due to human error or other circumstances can lead to an explosion, known as an "arc flash" event, and can lead to major injury or death.

SUMMARY

An enclosure assembly includes a first enclosure unit including a first door and a second enclosure unit. A handle is coupled to the second enclosure unit with the handle being operative so as to turn on or turn off power to the first enclosure unit. The first enclosure unit and the second enclosure unit are configured such that the first door cannot be opened if the handle has not been turned to a power-off position.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

Figure 1:
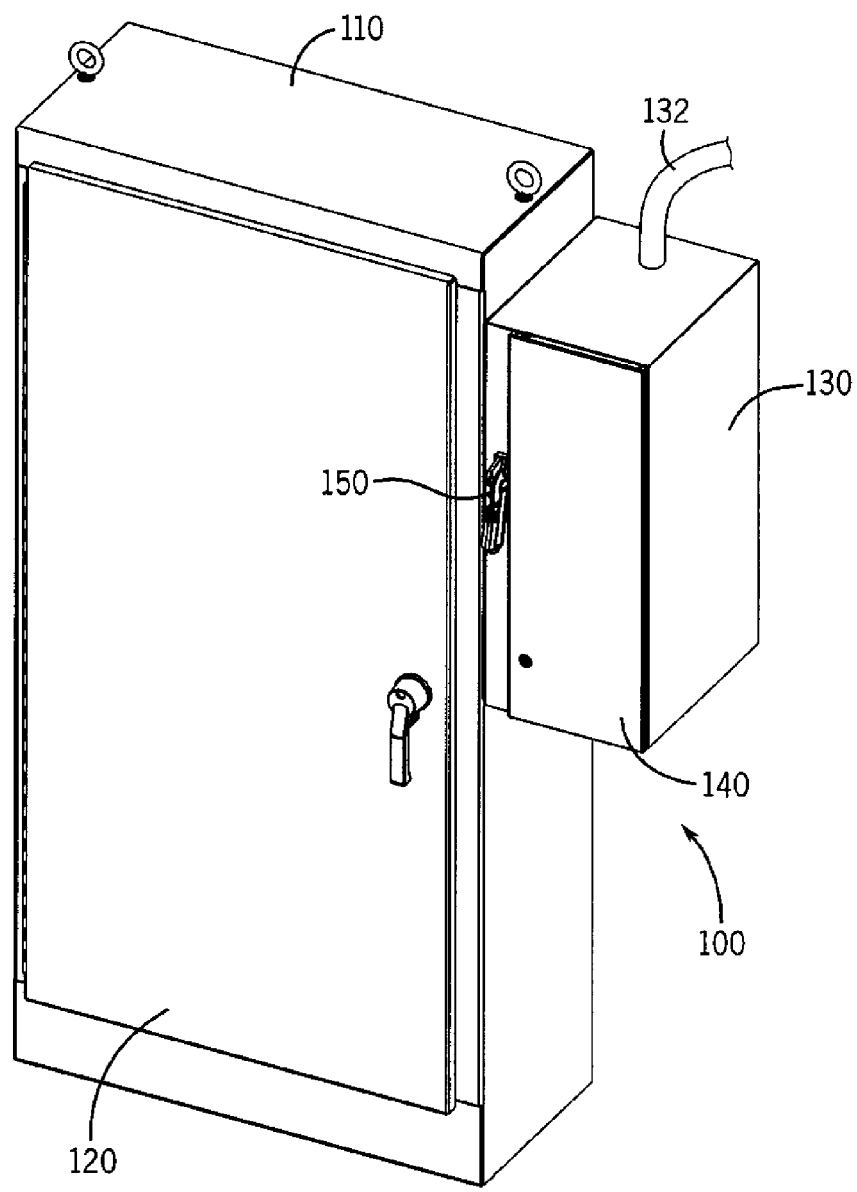
FIG. 1 shows a perspective view of an enclosure assembly according to one embodiment.
Figure 2:
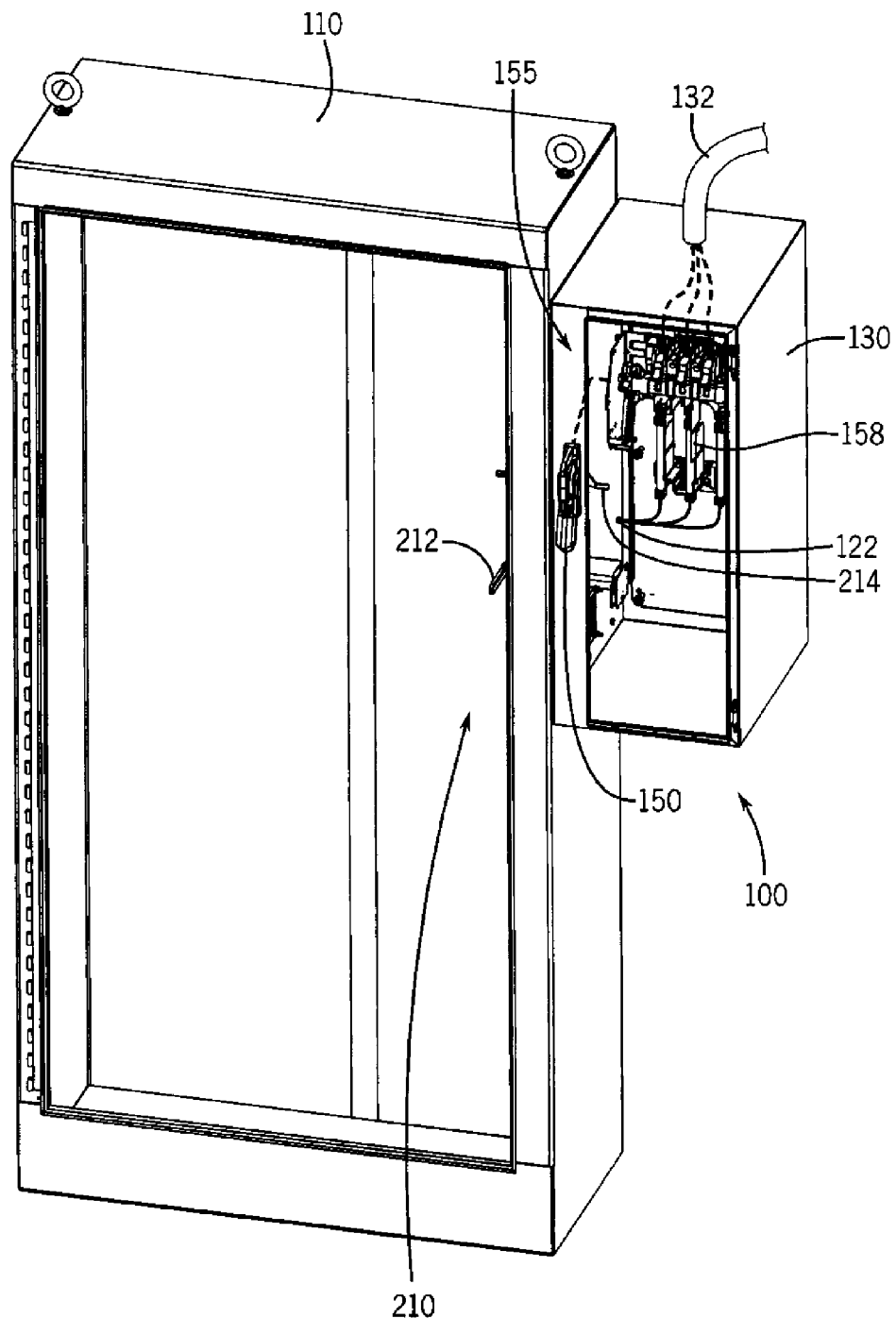
FIG. 2 a perspective view of the enclosure assembly of FIG. 1.

FIG. 1 shows a perspective view of an enclosure assembly 100 according to one embodiment. FIG. 2 shows the same view of enclosure assembly 100 with the doors removed to show further details. In general, enclosure assembly 100 includes a first enclosure unit 110 including a first door 120 and a second enclosure unit 130 including a second door 140. In one embodiment, first enclosure unit 110 includes a metal box defining a back wall, four side walls and front door 120, and second enclosure unit 130 includes a metal box defining a back wall, four side walls, and front door 140. First enclosure 110 is designed to hold electrical equipment such as relays, wires, switches, and contacts, for example.

A hand-operable handle 150 is coupled to the second enclosure unit 130. Handle 150 is a switch handle and a component of a switch 155. Switch 155 includes handle 150 and switch contacts 158, which are schematically shown in FIG. 2. Switch contacts 158 are located entirely within enclosure unit 130. Thus, if a there is an arc flash within enclosure unit 130, it does not affect anything in enclosure unit 110. Switch handle 150 is operable to turn off and on switch contacts 158. For example, switch 155 can be a typical disconnect switch. Power enters second enclosure 130 by electrical lines 132. Lines 132 are operatively coupled to the switch contacts 158, and lines 132 then enter first enclosure 110 through a hole 122 located in the side walls of enclosures 120 and 130.

In one embodiment, switch 155 is configured such that the door 120 of the first enclosure unit 110 cannot be opened unless switch 155 is turned to a power-off position. For example, an interlock latch mechanism 210 can be configured in the enclosure assembly 100. Latch mechanism 210 includes a first bar 212 that is operatively coupled to handle 150 and is configured to allow door 120 to be opened if handle 150 is turned to an off position and latches the door if the handle is turned to an on position. Likewise, latch mechanism 210 includes a second bar 214 that operatively coupled to handle 150 and is configured to allow door 140 to be opened if handle 150 is turned to an off position and latches the door if the handle is turned to an on position. In one example, bars 212 and 214 can be ends of a single bar extending between enclosures 110 and 130.

Accordingly, handle 150 of switch 155 is operative so as to turn on or turn off power to first enclosure unit 110 with the contacts 158 of the switch 155 located external to first enclosure unit 110. Moreover, first enclosure unit 110 and second enclosure unit 130 are configured such that the first door 120 is latched shut by latch mechanism 210 and cannot be opened if the handle 150 (and thus switch 155) has not been turned to an off position.

The switch 155 and contacts 158 are in a separate enclosure than the main enclosure 110. This means that no current is allowed to enter the first enclosure unit 110 once handle 150 is turned to the off position. This eliminates the arc flash potential in enclosure unit 110 since the first door 120 cannot be opened unless the handle 150 is turned off or the handle 150 is defeated by mechanical means.

Figure 3:
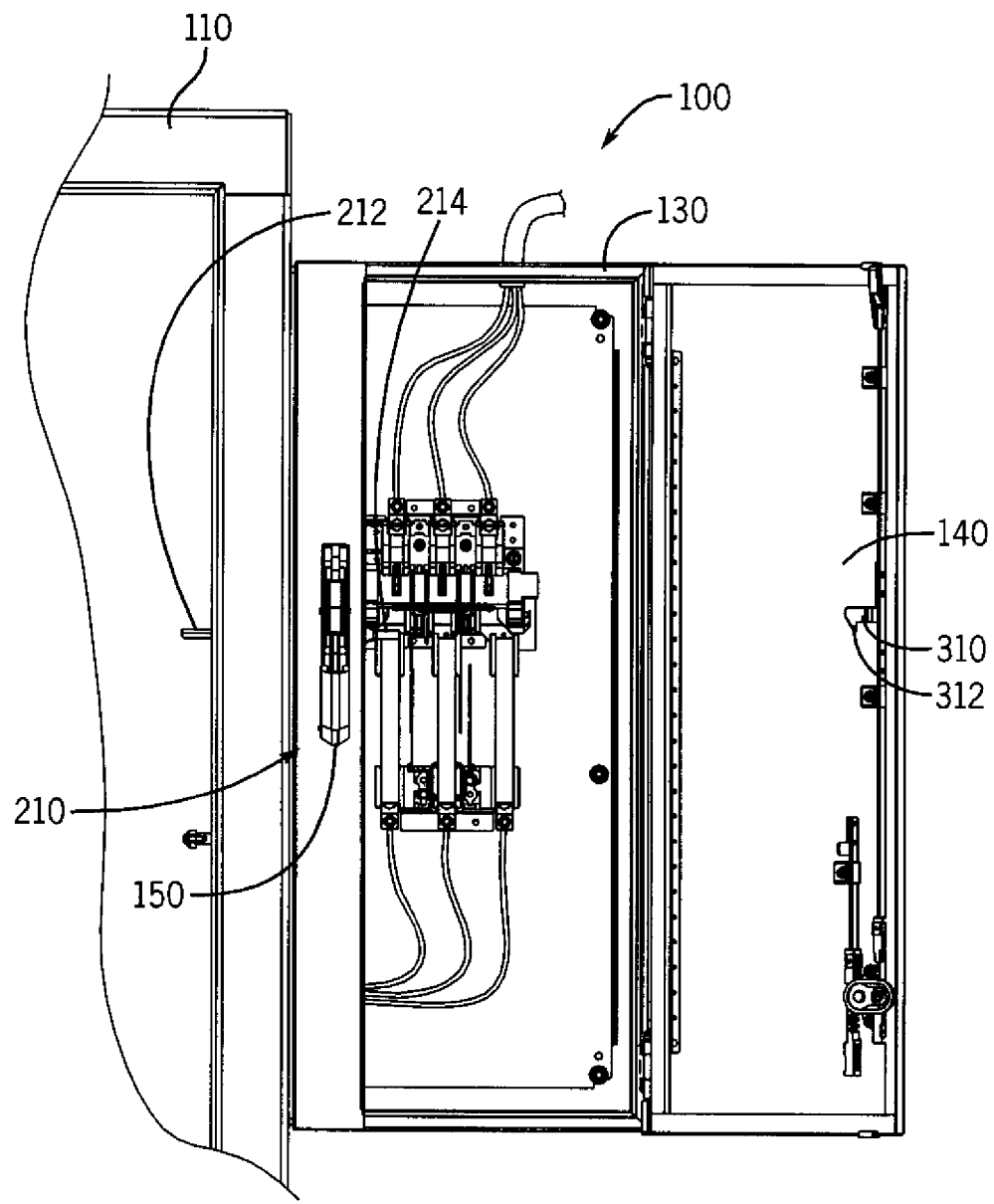
FIG. 3 shows a front view of the enclosure assembly of FIG. 1.

FIG. 3 shows a front view of enclosure assembly 100. Latch mechanism 210 further includes a latch 310 mounted to door 140 of second enclosure unit 130. Latch 310 includes a hooked front end 312 to engage bar 214 when the door 140 is closed. In one embodiment, latch mechanism 210 can be spring-loaded so that the hooked end 312 can go over the bar 214 if the bar 214 is already in a closed position. A similar latch can be attached to the door 120 of first enclosure unit 110 to engage bar 212.

Figure 4:
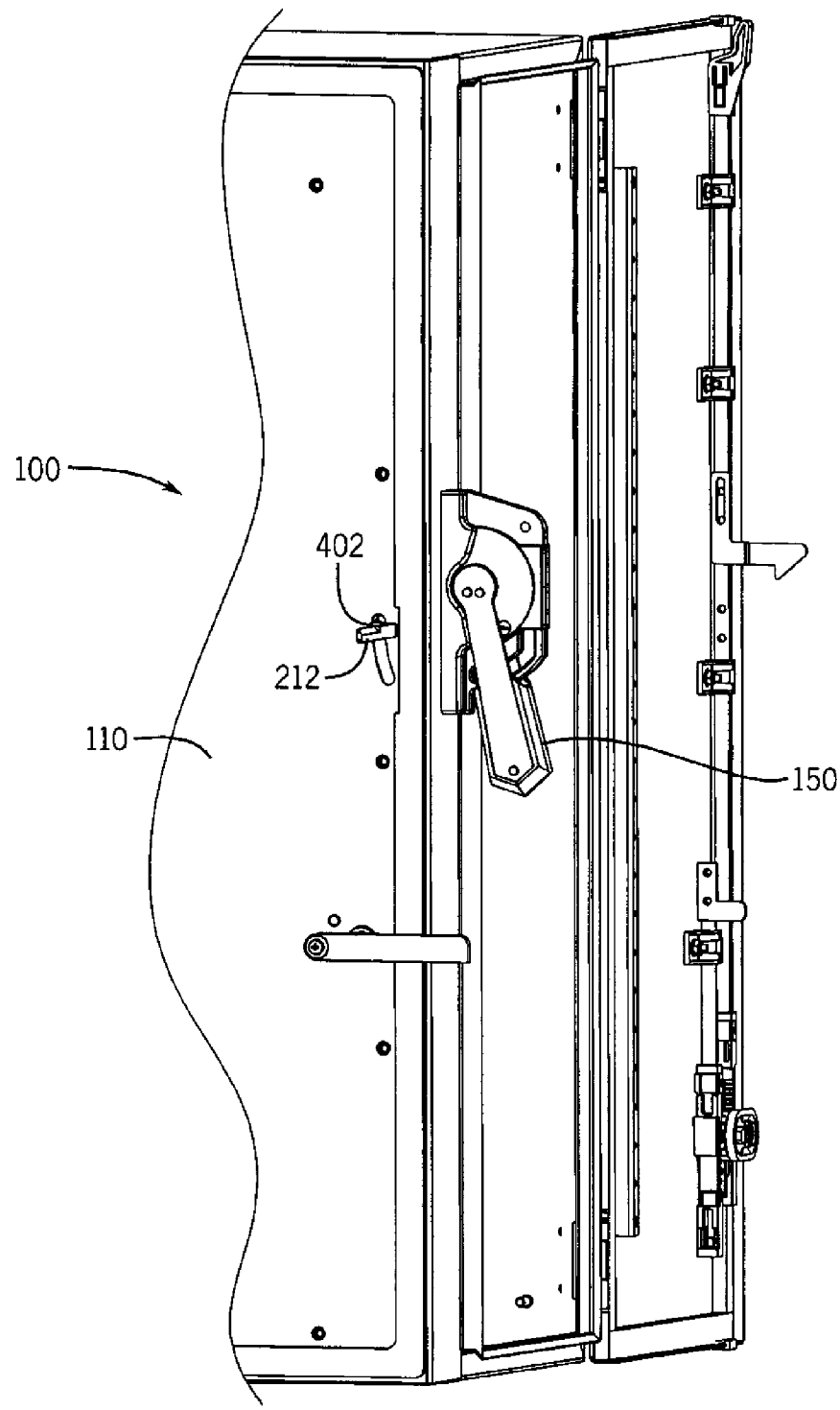
FIG. 4 shows details of a latch assembly for the enclosure assembly, in accordance with one embodiment.

FIG. 4 shows a side view of enclosure assembly 100 from inside first enclosure unit 110, in accordance with one embodiment. Bar 212 extends through a slot 402 in the side wall of first enclosure unit 110. In one example, as handle 150 is rotated upward, the bar is positioned to lock the door of enclosure unit 110 closed. Conversely, when the handle 150 is rotated downward, turning the power off, the bar moves so as to unlatch the door of the first enclosure unit 110.

Figure 5:
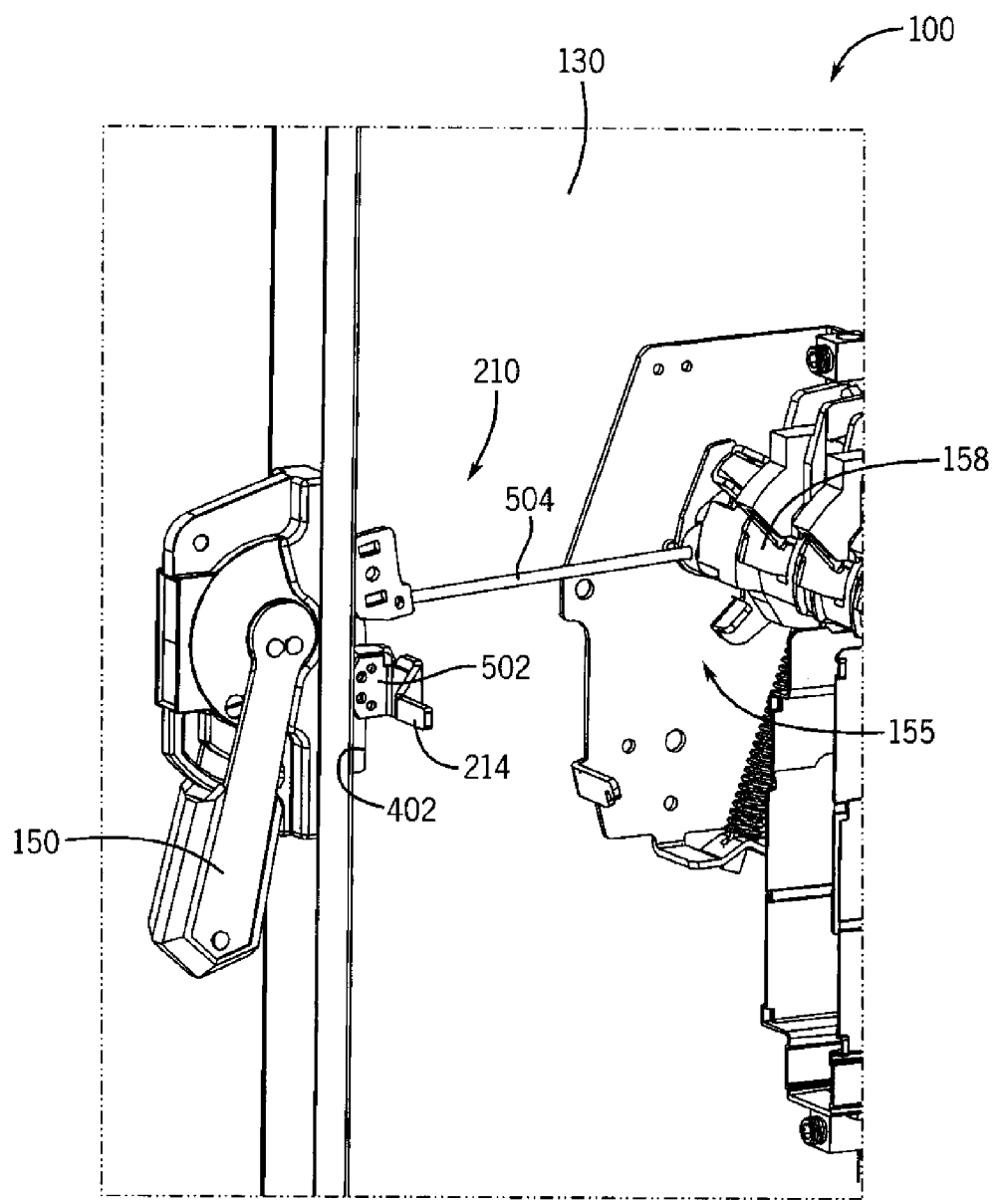
FIG. 5 shows details of a latch assembly for the enclosure assembly, in accordance with one embodiment.

FIG. 5 shows a side view of enclosure assembly 100 from inside second enclosure unit 130, in accordance with one embodiment. Handle 150 is mechanically coupled to a linkage 504 to engage and disengage switch contacts 158 of switch 155. In one embodiment, latch mechanism 210 further includes a plate 502 that is mechanically coupled or linked to handle 150. Bar 214 extends from plate 502 into second enclosure unit 130. As handle 150 is rotated upward, the bar 214 is positioned to latch the door of enclosure unit 130 closed. Conversely, when the handle 150 is rotated downward, turning the power off, the bar 214 moves so as to unlatch the door of the second enclosure unit 130. Bar 212 extends from the other side of plate 502 and functions in a similar fashion to latch and unlatch the door of enclosure 110. In one embodiment, bars 212 and 214 can be ends of a single bar mounted to plate 502.

Figure 6:
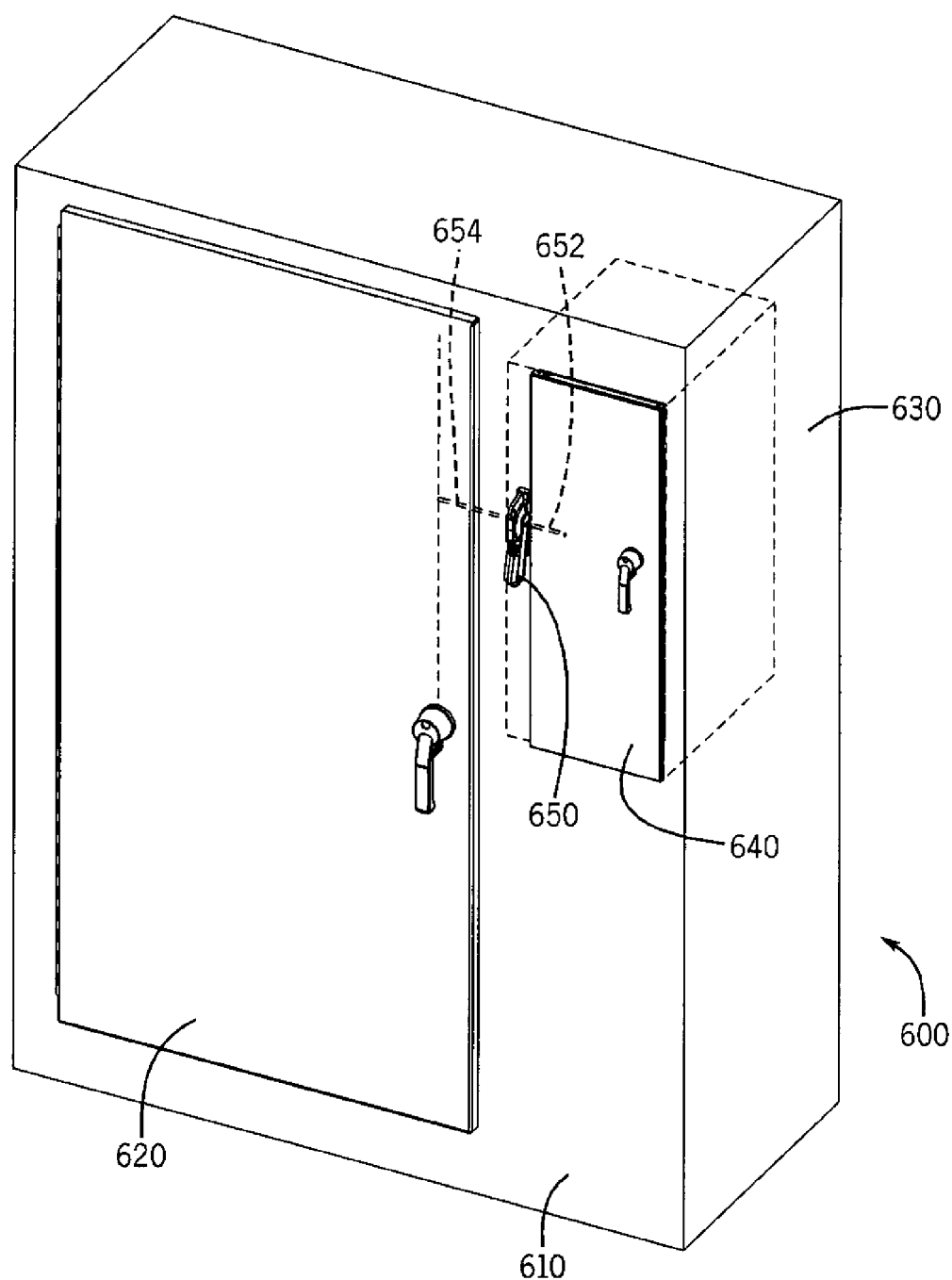
FIG. 6 shows an enclosure assembly, in accordance with one embodiment.

In one embodiment, the first and second enclosure units 110 and 120 are directly adjacent each other. In some embodiments, the units can be separated by up 2 inches or more, for example FIG. 6 shows an enclosure assembly, in accordance with one embodiment. In this example, a second enclosure unit 630 is encapsulated within a first enclosure unit 610. A handle 650 is used to control switch contacts which are entirely located within enclosure 630. The switch handle 650 is further coupled to a latch mechanism, including bars 652 and 654. As the switch handle is opened, the bars 654 and 652 move to allow doors 640 and 620 to be opened.

Figure 7:
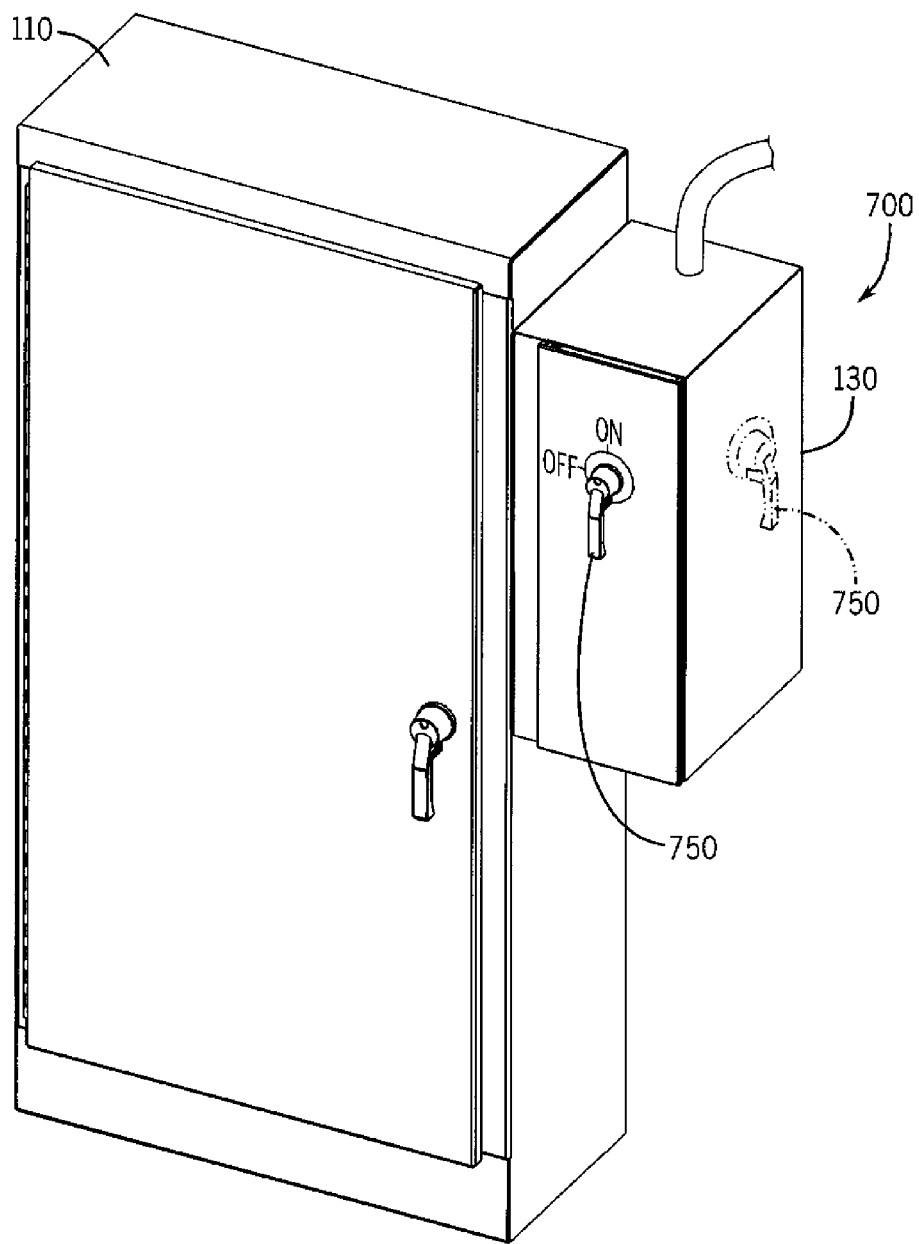
FIG. 7 shows an enclosure assembly, in accordance with one embodiment.

In other examples, handles 150 or 650 can be in the form of a rotary handle configured for a rotary switch. For example, FIG. 7 shows an enclosure assembly 700, in accordance with one embodiment. In this example, enclosure assembly 700 includes first enclosure unit 110 and second enclosure unit 130, as discussed above. A rotary switch including a switch handle 750 is located on the front of the second enclosure unit (or, optionally on the side of the second enclosure unit). The switch handle 750 is further coupled to a latch mechanism to keep the door of the first enclosure unit 110 latched until the switch is rotated off.

It is understood that the above description is intended to be illustrative and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. An enclosure assembly comprising:
    a first enclosure unit including a first door;
    a second enclosure unit; and
    a handle coupled to the second enclosure unit, the handle being operative so as to turn on or turn off power to the first enclosure unit, and wherein the first enclosure unit and the second enclosure unit are configured such that the first door cannot be opened if the handle has not been turned to a power-off position.

2. The enclosure assembly of claim 1, wherein the handle is coupled to a switch mechanism, the switch mechanism is located entirely within the second enclosure unit.

3. The enclosure assembly of claim 1, including a latch mechanism coupled to the handle, the latch mechanism including a movable bar to latch the first door closed.

4. The enclosure assembly of claim 1, wherein the first enclosure unit and the second enclosure unit are adjacent each other.

5. The enclosure assembly of claim 1, wherein the first enclosure unit includes a metal box defining a back wall, four side walls and the first door.

6. The enclosure assembly of claim 1, wherein the second enclosure unit includes a metal box defining a back wall, four side walls, and a second door.

7. The enclosure assembly of claim 1, wherein the first enclosure unit and the second enclosure unit are configured such that the second door cannot be opened unless the first door is opened.

8. An enclosure system comprising:
    a first enclosure unit including a door;
    a second enclosure unit;
    a switch located within the second enclosure unit, the switch configured to control a power supply which enters the second enclosure unit and continues from the second enclosure unit into the first enclosure unit;
    wherein the switch is connectable to the power supply and operable to switch off and on the power running into the first enclosure unit, the switch including switch contacts located entirely within the second enclosure unit, the switch including a switch handle configured such that the door of the first enclosure unit cannot be opened unless the switch handle is turned to an off position.

9. The enclosure assembly of claim 8, wherein the second enclosure unit includes a second door, wherein the first enclosure unit and the second enclosure unit are configured such that the second door cannot be opened unless the first door is opened.

10. The enclosure assembly of claim 8, the second enclosure unit including a door, wherein the switch handle being configured such that the door of the second enclosure unit cannot be opened unless the switch handle is turned to an off position.

11. The enclosure assembly of claim 8, wherein the first enclosure unit and the second enclosure unit are mounted adjacent each other.

12. The enclosure assembly of claim 8, wherein the switch handle is coupled to a first bar which latches the first enclosure door shut.

13. A method comprising:
    providing an enclosure assembly including a first enclosure unit including a first door and a second enclosure unit including a second door;
    operating a switch located in the second enclosure unit, wherein the switch includes a handle operative so as to turn on or turn off power to the first enclosure unit, wherein the first enclosure unit and the second enclosure unit are configured such that the first door cannot be opened if the switch has not been turned off.

14. The method of claim 13, wherein operating the switch includes operating a handle located on the second enclosure unit.

15. The method of claim 13, wherein operating the handle includes moving a bar to unlatch the door of the first enclosure unit.

* * * * *